(12) United States Patent
Krishnarao et al.

(10) Patent No.: US 9,062,827 B2
(45) Date of Patent: Jun. 23, 2015

(54) PROXIMITY BASED THERMAL PROFILING FOR A POWER TOOL

(71) Applicants: Robert Bosch Tool Corporation, Broadview, IL (US); Robert Bosch GmbH, Stuttgart (DE)

(72) Inventors: Niranjan Sathyanarayanarao Krishnarao, Bangalore (IN); Bharadwaja Maharshi Ramaswamy, Bangalore (IN)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 13/827,066

(22) Filed: Mar. 14, 2013

(65) Prior Publication Data

US 2014/0090948 A1 Apr. 3, 2014

(30) Foreign Application Priority Data

Sep. 28, 2012 (IN) .......................... 4061/CHE/2012

(51) Int. Cl.
*F16P 3/14* (2006.01)
*B23Q 11/06* (2006.01)
*F16P 3/00* (2006.01)
*B23Q 11/00* (2006.01)
*B23Q 17/24* (2006.01)
*B27G 19/02* (2006.01)

(52) U.S. Cl.
CPC ............ *F16P 3/008* (2013.01); *B23Q 11/0082* (2013.01); *B23Q 11/0092* (2013.01); *B23Q 17/2438* (2013.01); *B27G 19/02* (2013.01); *F16P 3/14* (2013.01); *F16P 3/142* (2013.01)

(58) Field of Classification Search
CPC .. F16P 3/008; B23Q 11/0082; B23Q 17/2438
USPC ............................... 192/129 A, 130; 700/177
See application file for complete search history.

(56) References Cited

U.S. PATENT DOCUMENTS

| | | | |
|---|---|---|---|
| 7,439,512 B2 | 10/2008 | Garland | |
| 8,101,917 B2 | 1/2012 | Garland | |
| 8,113,097 B2* | 2/2012 | Marx et al. ......................... 83/58 |
| 2004/0200329 A1* | 10/2004 | Sako .................................. 83/58 |
| 2006/0197020 A1 | 9/2006 | Trzecieski et al. | |
| 2010/0018830 A1* | 1/2010 | Krapf et al. ............... 192/129 A |
| 2010/0057244 A1* | 3/2010 | Krapf et al. .................... 700/177 |
| 2010/0300256 A1* | 12/2010 | Loewe et al. ...................... 83/72 |

* cited by examiner

*Primary Examiner* — Richard Lorence
(74) *Attorney, Agent, or Firm* — Maginot Moore & Beck LLP (57) ABSTRACT

A power tool includes an actuator that moves an implement, an infrared sensor, and a range sensor. A controller in the power tool receives temperature data and range data corresponding to objects in a region proximate to the implement. If an object in the predetermined has a temperature within a predetermined range and is identified as being within a predetermined minimum distance of the moving implement, then the controller deactivates the actuator to halt the implement.

13 Claims, 5 Drawing Sheets

PROXIMITY BASED THERMAL PROFILING FOR A POWER TOOL

CLAIM OF PRIORITY

This application claims priority to a pending Indian application with serial number 4061/CHE/2012, which is entitled "PROXIMITY BASED THERMAL PROFILING FOR A POWER TOOL," and was filed on Sep. 28, 2012.

TECHNICAL FIELD

This disclosure relates generally to power tools, and, more specifically, to systems and methods for detecting proximity between a human and a moving implement in a power tool.

BACKGROUND

Detection or sensing systems have been developed for use with various kinds of manufacturing equipment and power tools. Such detection systems are operable to trigger a reaction device by detecting or sensing the contact of some appendage of an operator with some part of the equipment. For example, capacitive contact sensing systems in table saws that are known to the art detect contact between the operator and the blade, and a reaction device, such as a brake or blade withdrawal device, either halts motion of the blade or removes the blade from contact with the human.

Existing detection systems are generally configured to identify contact between a moving part of the power tool, such as a saw blade, and an appendage or other part of the human body before halting the motion of the blade. The existing systems detect either direct contact with the human appendage, or extreme proximity to the human appendage through capacitive coupling at distances of no more than a few millimeters. Given the minimal detection distances, the existing systems often require high-precision mechanisms to halt a moving saw blade or other implement in a very short time period, such as within 1 millisecond. In light of these deficiencies, improvements to detection systems that enable identification of potential contact between a human appendage and a moving implement in a power tool without requiring direct contact between the appendage and implement would be beneficial.

SUMMARY

In one embodiment, a power tool has been developed. The power tool includes an actuator configured to move an implement, an infrared sensor configured to generate temperature data corresponding to a region proximate to the implement in which a plurality of objects approach the implement, a range sensor located at a predetermined distance from the implement and configured to generate range data corresponding to the plurality of objects in the region proximate to the implement, and a controller operatively connected to the infrared sensor, the range sensor, and the actuator. The controller is configured to operate the actuator to move the implement, identify a presence of an object having a temperature within a predetermined temperature range in the region proximate to the implement with reference to the temperature data received from the infrared sensor, identify a distance between the implement and the object having the temperature within the predetermined temperature range with reference to the range data received from the range sensor, and stop movement of the implement in response to the identified distance between the implement and the object having the temperature within the predetermined temperature range being less than a predetermined threshold.

In another embodiment, a method of operating a power tool has been developed. The method includes operating an actuator to move an implement associated with the power tool, identifying a presence of an object having a temperature within a predetermined temperature range in a region proximate to the implement with reference to temperature data received from an infrared sensor, identifying a distance between the object having the temperature within the predetermined temperature range and the implement with reference to the range data received from a range sensor, and stopping movement of the implement in response to the identified distance between the implement and the object having the temperature within the predetermined temperature range being less than a predetermined threshold.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "power tool" refers to any tool with one or more moving parts that are moved by an actuator, such as an electric motor, an internal combustion engine, a hydraulic or pneumatic cylinder, and the like. For example, power tools include, but are not limited to, bevel saws, miter saws, table saws, circular saws, reciprocating saws, jig saws, band saws, cold saws, cutters, impact drives, angler grinders, drills, jointers, nail drivers, sanders, trimmers, and routers. As used herein, the term "implement" refers to a moving part of the power tool that is at least partially exposed during operation of the power tool. Examples of implements in power tools include, but are not limited to, rotating and reciprocating saw blades, drill bits, routing bits, grinding disks, grinding wheels, and the like. As described below, a monitoring system integrated with a power tool is used to halt the movement of the implement to avoid contact between a human operator and the implement while the implement is moving.

Figure 1:
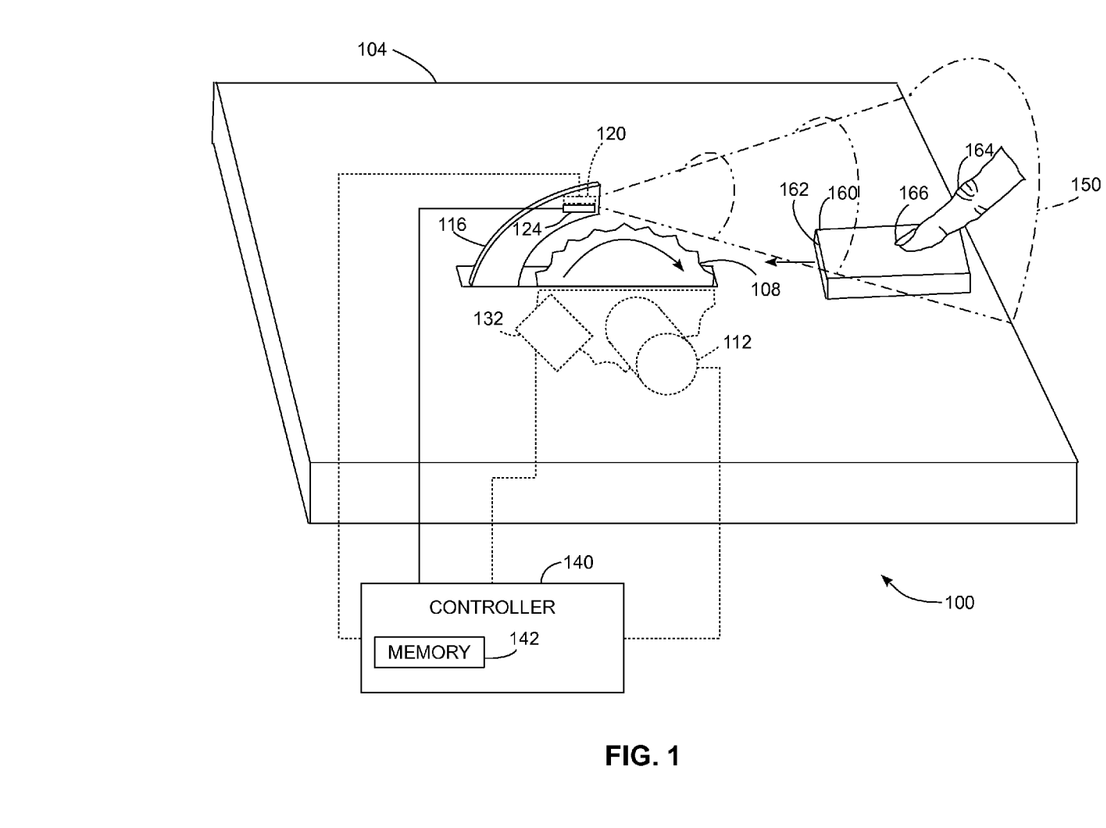
FIG. 1 is a perspective view of a table saw that is configured to identify objects that approach a saw blade in the saw and deactivate a motor that drives the saw blade prior to contact between the saw blade and a human.

FIG. 1 depicts a table saw 100. The table saw 100 includes a table 104 through which a saw blade 108 extends for cutting work pieces, such as pieces of wood. The table saw 100 also includes an electric motor 112, riving knife 116, infrared sensor 120, range finding sensor 124, blade brake 132, and controller 140. The general configuration of the table 104, blade 108, and motor 112 are well known to the art for use in cutting work pieces and are not described in greater detail herein. Additionally, riving knives similar to the riving knife 116 are known to the art, but existing riving knives do not incorporate sensors, such as the infrared sensor 120 and range finding sensor 124. Some components that are commonly used in table saws, such as guides for work pieces, blade height adjustment mechanisms, and blade guards are omitted from FIG. 1 for clarity.

In the saw 100, the infrared sensor 120 and range finding sensor 124 are both mounted to the riving knife 116 above the saw blade 108. The infrared sensor 120 is, for example, a thermal imaging device that generates image data of objects in a region 150 extending from the riving knife 116. The region 150 is approximately conical in shape and extends along the length of the saw blade 108 over the table 104. The range finding sensor 124 is a laser range finder or other range finding device that generates data corresponding to the distance between the range finder 124 and one or more objects in the region 150. In the saw 100, the riving knife 116 is located at a predetermined distance from the saw blade 100, and the riving knife 116 moves with the saw blade 108 as the saw blade 108 is adjusted during operation. Thus, the range finding sensor 124 is located at a predetermined distance from the saw blade 108 during operation of the saw.

The controller 140 is operatively connected to the motor 112, infrared sensor 120, range finding sensor 124, and a brake 132. The controller 140 includes one or more digital logic devices including general purpose central processing units (CPUs), microcontrollers, field programmable gate arrays (FPGAs), application specific integrated circuits (ASICs) and any other digital logic devices that are suitable for operation of the saw 100. The controller 140 includes a memory 142 that stores programmed instructions for the operation of the controller 140, and optionally stores data received from the infrared sensor 120 and range finding sensor 124. In one configuration, the memory 142 stores temperature data and range data for one or more objects in the region 150 to track the direction of movement and rate of movement of the objects over time.

During operation, the controller 140 receives data from the infrared sensor 120 corresponding to the temperatures of one or more objects in the region 150, and the controller 140 receives range data from the range finding sensor 124 corresponding to the distance between the range finding sensor 124 and one or more objects in the region 150. The controller 140 further identifies the distance between the objects and the saw blade 108 with reference to both the distance between the range finding sensor 124 and the objects and the predetermined distance between the range finding sensor 124 and the blade 108. As described in more detail below, the controller 140 deactivates the motor 112 and operates the brake 132 if the data received from the infrared sensor 120 and the range finding sensor 124 indicate that an appendage or other part of a human operator is within a predetermined distance of the saw blade 108, or if the motion of the human operator indicates likely contact with the saw blade 108.

During operation, the motor 112 rotates the saw blade 108 as indicated in FIG. 1. An operator moves one or more work pieces, such as a piece of wood 160, toward the rotating blade 108 for cutting. A human operator typically pushes the work piece with an appendage, such as a finger 164 depicted in FIG. 1, or one or more hands. The infrared sensor 120 generates temperature data corresponding to both the wood work piece 160 and the finger 164. The range finding sensor 124 generates range data corresponding to the leading edge 162 of the work piece 160 or the tip 166 of the finger 164. The controller 140 distinguishes between the block 160 and the finger 164 based on the different temperatures of the wood block 166 and the finger 164. If the finger 164 remains beyond a predetermined distance from the blade 108 and if the rate at which the finger 164 approaches the blade 108 remains sufficiently low, the motor 112 continues to rotate the blade 108 as the work piece 160 contacts the blade 108 for cutting.

Figure 2:
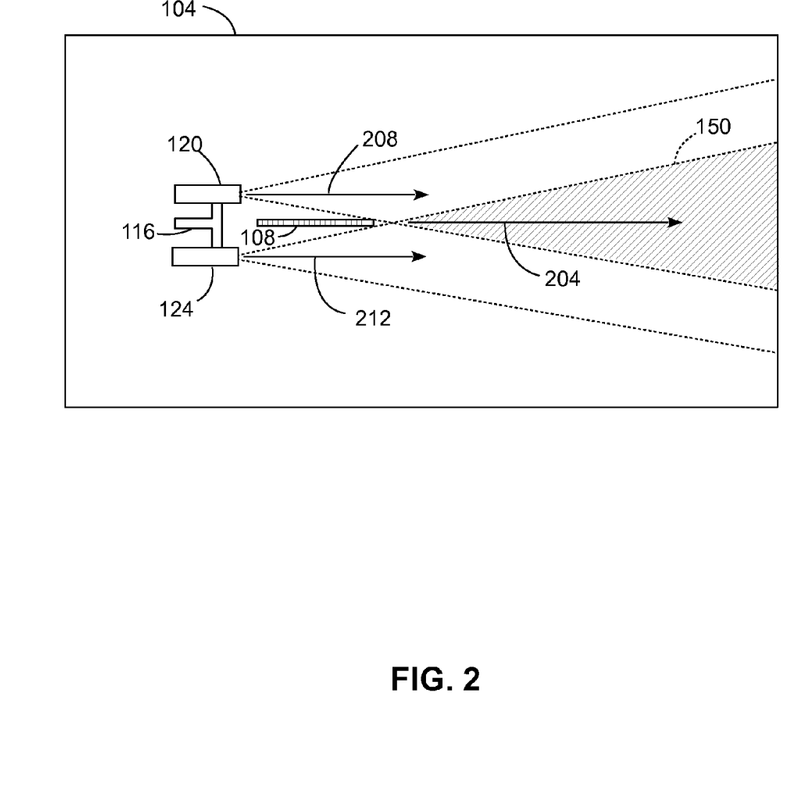
FIG. 2 is a plan view of the table saw of FIG. 1.

FIG. 2 depicts a simplified overhead view of the table saw 100. In FIG. 2, the riving knife 116 supports the infrared sensor 120 and range finding sensor 124 on opposite sides of a longitudinal axis 204 extending through the length of the saw blade 108 and riving knife 116. The infrared sensor 120 and range finding sensor 124 each detects temperatures and ranges to objects, respectively, in separate conical regions extending along axes 208 and 212, respectively, which are parallel to the longitudinal axis 204 through the length of the blade 108. The region 150 includes the overlapping detection region where both the infrared sensor 120 and the range finding sensor 124 detect objects on and above the table 104. In FIG. 2, the saw blade 108 is outside of the region 150. Because the temperature of the saw blade 108 changes rapidly during operation of the table saw 100, noise could be introduced into the data received from the sensors 120 and 124, so the sensors 120 and 124 are arranged to generate data for the region 150 for objects approaching the blade 108. In the embodiment of FIG. 2, the riving knife 116 is formed with a "T" shape to position the sensors 120 and 124 at locations where neither sensor detects the saw blade 108.

While FIG. 1 and FIG. 2 depict a table saw as an illustrative example of a power tool, alternative embodiments incorporate the infrared sensor 120 and range finding sensor 124 in a wide range of power tools including, but not limited to, handheld electric drills, drill presses, handheld circular saws, reciprocating saws, band saws, routers, grinders, and any other power tool with a moving implement. In the alternative embodiments, one or more infrared sensors and range finding sensors are mounted on the housings or supports of the various power tools to enable monitoring of a region proximate to the implement where a hand or other part of a human may approach the implement during operation.

Figure 3:
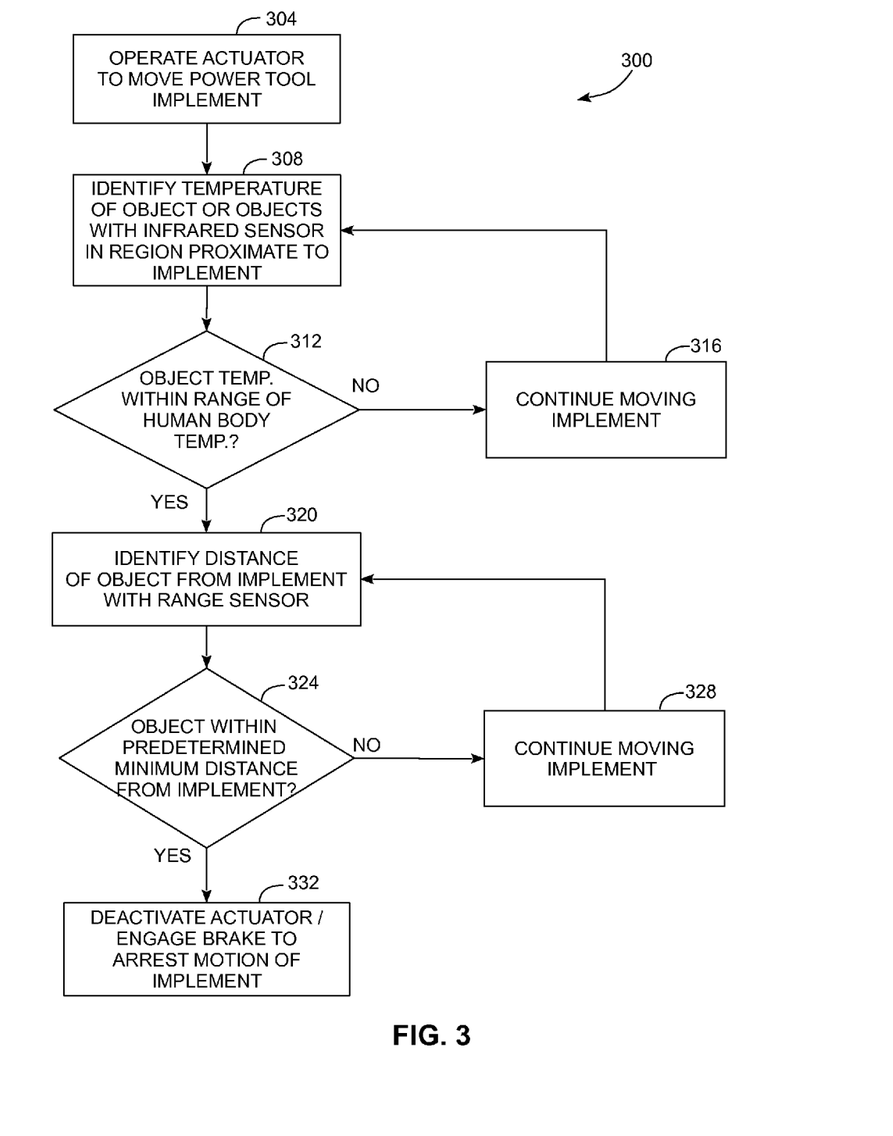
FIG. 3 is a flow diagram of a process for halting motion of an implement in a power tool when a portion of a human body is within a predetermined distance of a moving implement associated with the power too.

FIG. 3 depicts a process 300 for stopping movement of an implement in a power tool if a human is within a predetermined distance of the moving implement. FIG. 3 is described in conjunction with the saw 100 of FIG. 1 and FIG. 2 for illustrative purposes. In the discussion below, a reference to the process 300 performing a function or action refers to one or more processors, such as the controller 140, executing programmed instructions stored in a memory to perform the function or action.

Process 300 begins as the power tool operates an actuator to move an implement (block 304). In saw 100, the electric motor 112 is the actuator and the saw blade 108 is the implement. The electric motor 112 is activated to rotate the saw blade 108 to cut work pieces, such as the wood block 160. Process 300 continues as the infrared sensor detects objects in the region proximate to the implement (block 308). In the saw 100, the infrared sensor 120 senses one or more objects, such as the work piece 160 and the finger 164, in the region 150. In the saw 100, the infrared sensor 120 generates a two-dimensional arrangement of image data pixels, similar to a photograph of the objects 150 and 164. Each pixel in the image data includes a temperature measurement data corresponding to the temperature of an object at a particular location. For example, image data include a region of pixels corresponding to the temperature of the wood block 160, which is often similar to the ambient temperature of the work environment around the saw 100. The pixels corresponding to the finger 164 are around the range of human body temperature. Because humans are warm blooded, the temperature of the finger 164 remains within a relatively narrow temperature range over a wide range of environmental conditions. For example, in the saw 100 the relatively narrow temperature range is approximately 35° C. to 40° C. to account for variations between the normal body temperature of different individuals and for situations, such as illness, in which a human does not exhibit a standard body temperature. The temperature range described above also includes the body temperatures of many warm blooded animals, including many domesticated animals, such as pets.

During the processing of block 308, the controller 140 identifies one or more individual objects from the pixels in the temperature image data that are received from the infrared sensor 120. The controller 120 applies one or more image processing algorithms, such as edge detection and clustering, to distinguish objects in the image data. For example, the controller 140 identifies that the work piece 160 is a separate object from the finger 164 with reference to the range of temperatures identified in the work piece 160 compared to the different temperature range of the finger 164, which is within the predetermined temperature range of approximately 35° C. to 40° C.

During process 300, if the only objects that the controller 140 identifies in the data received from the infrared sensor 120 correspond to objects that are outside the predetermined temperature range (block 312), then the power tool continues operation with the actuator moving the implement (block 316). In the saw 100, the motor 112 continues turning the saw blade 108, and the controller 140 continues to monitor temperature image data received from the infrared sensor 120 (block 308).

During process 300, if the controller 140 identifies one or more objects in the region 150 that are within the predetermined temperature range (block 312), then the controller 140 identifies the distance between the objects and the moving implement using data received from the range finding sensor 124 (block 320). In the saw 100, the range finding sensor 124 generates another two-dimensional arrangement of image data pixels of the region 150 with each pixel in the image data including data corresponding to a distance between an object in the region 150 and the range finding sensor 124. The image data from the range finding sensor 124 are referred to as a "depth map" of the region 150. The controller 140 references both the temperature data from the infrared sensor 120 and the corresponding depth map data from the range finding sensor 124 to identify the distance of one or more objects, such as the work piece 160 and finger 164, from the moving saw blade 108. As described above, the range finding sensor 124 is located at a predetermined distance from the saw blade 108, and the controller 140 further modifies the distance data in the depth map received from the range finding sensor 124 to identify the actual distance between the objects and the saw blade 108.

During process 300, if the depth map data indicate that objects having a temperature within the predetermined temperature range are not within a predetermined minimum distance from the implement (block 324), then the power tool continues operating with the moving implement as the object approaches the implement (block 328). For example, in the FIG. 1, the controller 140 identifies the finger 164 as being within the temperature range corresponding to a part of a human body. The controller 140 also identifies the distance of the finger 164 from the saw blade 108. The motor 112 continues to rotate the saw blade 108 when the finger 164 remains beyond a predetermined distance from the blade 108. For example, in one configuration the blade 108 continues to rotate when the portion of the finger 164 that is closest to the blade 108, such as the finger tip 166, remains at least 2 centimeters away from the blade 108. During process 300, the range finding sensor 124 and the controller continue to monitor the distance between objects in the region 150 and the saw blade (block 320).

If the object with the temperature in the predetermined range moves within the predetermined minimum distance from the implement (block 324) then the power tool deactivates the actuator and optionally engages a brake or other mechanism to halt movement of the implement (block 332). In the saw 100, if an object within the predetermined temperature range, such as the finger 164, moves within the predetermined minimum distance of the rotating saw blade 108, then the controller 140 deactivates the electric motor 112 and engages a brake 132 to halt the saw blade 108. In another table saw embodiment, the controller 140 also operates a retraction mechanism that withdraws the saw blade 108 below the surface of the table 104.

In the table saw 100, the saw blade 108 generally continues rotating for a period of several seconds due to the momentum that the saw blade 108 accumulates during operation. The brake 132 enables the saw blade 108 to be halted in a much shorter period of time. In other power tool embodiments, the moving implement halts in a short period of time after deactivation of an actuator without the requirement for an additional brake mechanism.

In one embodiment, the brake 132 is a frictional brake applied to the sides of the saw blade 108 to arrest the motion of the saw blade 108. Some existing systems that detect contact between a portion of the human body and a blade in a table saw include an explosive charge and a mechanical stop that is forced into the teeth of the saw blade 108 to halt the saw blade 108 in a very short period of time, typically on the order of 1 millisecond. Such brake systems are required because the existing systems detect actual human contact with the blade and the blade must be halted in a very short time to avoid additional contact with the human. The explosive systems typically damage the saw blade and deform a brake member in the saw intentionally in order to absorb the mechanical energy of the saw blade in a short period of time. While an explosive brake system can be incorporated in an alternative embodiment of the saw 100, the process 300 enables the controller 140 to identify when a portion of the human body moves within a predetermined minimum distance from the moving blade 108. Consequently, a friction brake 132 can be used to arrest the motion of the blade 108 prior to the blade 108 contacting the finger 164 while reducing or eliminating damage to components within the saw 100.

Figure 4:
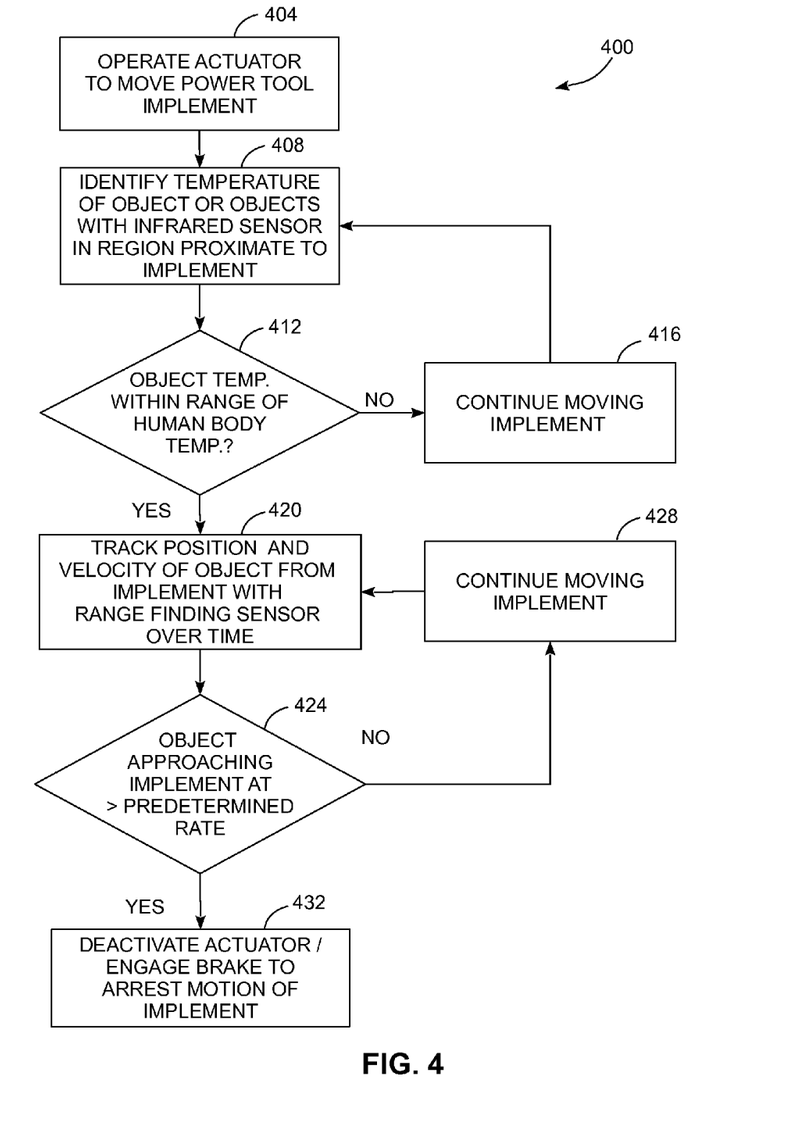
FIG. 4 is a flow diagram of a process for halting motion of an implement in a power tool when a portion of a human body moves towards the implement at greater than a predetermined rate.
Figure 5:
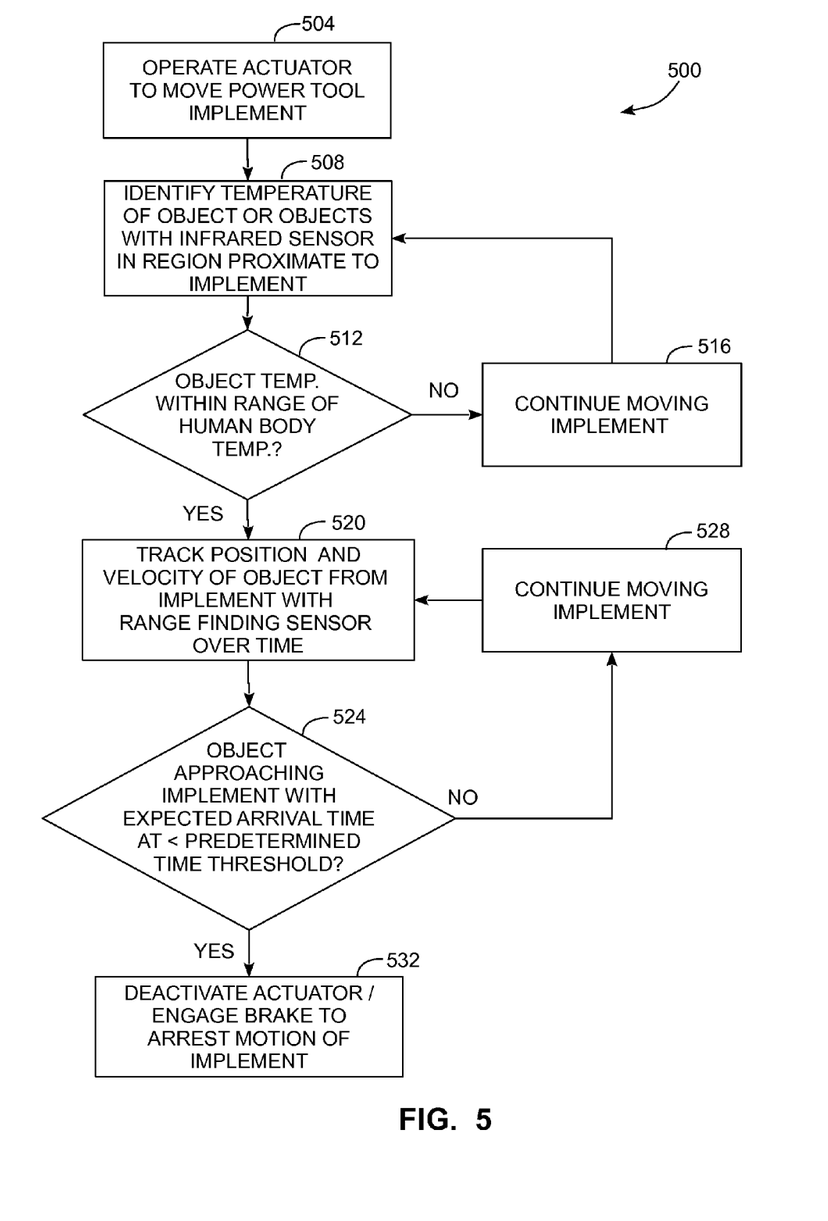
FIG. 5 is a flow diagram of a process for halting motion of an implement in a power tool when a portion of a human body moves towards the implement with an estimated arrival time to a predetermined minimum distance from the implement being less than a predetermined threshold.

In process 300, a power tool deactivates an actuator that is moving an implement in response to a portion of the human body moving within a predetermined distance of the implement. FIG. 4 and FIG. 5 depict processes 400 and 500 respectively, in which a power tool deactivates the actuator in response to detecting motion of a portion of the human body in a manner that indicates a high likelihood that the implement contacts the human body. The saw 100 is configured to perform one or more of the processes 300, 400, and 500 during operation.

FIG. 4 depicts a process 400 for stopping movement of an implement in a power tool in response to identifying that a portion of a human body is moving toward the implement at greater than a predetermined rate. FIG. 4 is described in conjunction with the saw 100 of FIG. 1 and FIG. 2 for illustrative purposes. In the discussion below, a reference to the process 400 performing a function or action refers to one or more processors, such as the controller 140 executing programmed instructions stored in a memory to perform the function or action.

Process 400 begins when the power tool operates the actuator to move the implement (block 404), and the power tool identifies objects in the region proximate to the implement with an infrared sensor (block 408). A controller in the power tool identifies if the data received from an infrared sensor include an object with a temperature in the predetermined temperature range corresponding to a portion of a human (block 412) and the actuator continues to move the implement when no objects in the predetermined temperature range are identified (block 416). The processing described with reference to blocks 404-416 is performed in the same manner as the processing described above with reference to blocks 304-316, respectively, in the process 300.

If an object is identified that is within the predetermined temperature range of a portion of the human body (block 412), then the controller tracks the motion between the object and the implement in the power tool over time to identify the velocity of the object with respect to the implement (block 420). For example, in the table saw 100 the controller 140 receives a series of frames of depth image data from the sensor 124 at a rate of, for example, 60 or 120 frames per second. The controller 140 identifies a position of the object with respect to the saw blade 108 in each frame of depth data, and identifies the velocity of the object as the rate of change in the distance between the object and the implement over successive frames of depth image data that are received from the range finding sensor 124. The velocity of the object includes both the direction of movement of the object and the rate of movement of the object.

After identifying the velocity of the object, if the object is either not approaching the implement or approaching the implement at less than a predetermined velocity (block 424), then the actuator continues to move the implement (block 428). In the saw 100 the motor 112 continues to rotate the blade 108. The controller 140 continues to track the motion and velocity of the object using the data received from the range finding sensor 124 (block 416).

If the object is approaching the implement at greater than a predetermined velocity (block 420), then the controller operates the power tool to deactivate the actuator and optionally to engage a brake or other mechanism to halt movement of the implement (block 432). The controller operates the power tool to deactivate the actuator and engage a brake or other mechanism to arrest the movement of the implement with processing similar to that described above with reference to block 332 in FIG. 3.

In process 400 the controller operates the power tool to halt the movement of the implement when an appendage or other portion of a human body approaches the implement at greater than a predetermined rate. For example, in the configuration of FIG. 1 if the finger 164 approaches the saw blade 108 at a rate of greater than 15 centimeters per second in the region 150, then the controller 140 deactivates the motor 112 and applies the brake 132 to arrest the movement of the blade 108. If the finger 164 or other appendage on the human operator inadvertently slips while moving toward the blade 108, then the saw 100 halts the blade 108 prior to the finger 164 reaching the blade. Process 400 operates without regard to the absolute distance between the finger 164 and the blade 108 as long as the finger 164 is identified in the region 150 using the data received from the infrared sensor 120 and range finding sensor 124.

FIG. 5 depicts another process 500 implemented in the power tool to halt the movement of an implement in the power tool in response to motion of a human appendage or other portion of a human in a region proximate to the implement. FIG. 5 is described in conjunction with the saw 100 of FIG. 1 and FIG. 2 for illustrative purposes. In the discussion below, a reference to the process 500 performing a function or action refers to one or more processors, such as the controller 140, executing programmed instructions stored in a memory to operate one or more components of the power tool to perform the function or action.

Process 500 begins when the power tool operates the actuator to move the implement (block 504), and the power tool identifies objects in the region proximate to the implement with an infrared sensor (block 508). A controller in the power tool identifies if the data received from an infrared sensor include an object with a temperature in the predetermined temperature range corresponding to a portion of a human (block 512) and the actuator continues to move the implement when no objects in the predetermined temperature range are identified (block 516). If an object is identified that is within the predetermined temperature range of a portion of the human body (block 512) then the power tool tracks the motion between the object and the implement in the power tool over time to identify the velocity of the object with respect to the implement (block 520). The processing described with reference to blocks 504-520 is performed in the same manner as the processing described above with reference to blocks 404-420, respectively, in the process 400.

Process 500 continues as the power tool identifies whether the object is approaching the implement and an expected arrival time for the object within a predetermined distance of the implement using the identified velocity data for the object (block 524). In the tool 100, the controller 140 identifies the current position of the object, such as the finger 164, using the most recent depth image data received from the range finding sensor 124. If the finger 164 is moving toward the blade 108, then the controller identifies an estimated time at which the finger 164 either contacts the blade 108 or moves within a predetermined distance of the blade using the identified position and velocity of the finger 164. If the finger 164 is either moving away from the saw blade 108 or is moving toward the saw blade 108 with an expected arrival time that is greater than a predetermined time threshold, then the motor 112 continues to rotate the saw blade (block 528) and the controller 140 continues to track the position and velocity of the finger 164 (block 520).

If the object is moving toward the saw blade 108 and has an expected arrival time that is less than the predetermined time threshold (block 524), then the power tool deactivates the actuator and optionally engages a brake or other mechanism to halt movement of the implement (block 532). The power tool deactivates the actuator and engages a brake or other mechanism to arrest the movement of the implement with processing similar to that described above with reference to block 432 in FIG. 4. In one embodiment, the predetermined time threshold used in association with the processing described in block 524 corresponds to the amount of time required to halt the motion of the implement, such as the saw blade 108 in the saw 100.

The process 500 is similar to the process 400 in that both processes identify the velocity of a human appendage, such as the finger 164, or other portion of the human body in the region proximate to the moving implement, such as the saw blade 108. While the saw 100 halts the saw blade 108 with reference to the identified velocity in process 500, the saw 100 halts the saw blade 108 with reference to the expected time at which the finger 164 will be within a predetermined distance of the blade 108 in the process 500 using both the identified velocity and current position of the finger 164. So, for example, if the finger 164 is approaching the saw blade 108 at a rate of 10 cm/second at a distance of 32 cm, then the expected arrival time to reach a distance of 2 cm from the saw blade is 3 seconds. If the predetermined time threshold for deactivating the motor 112 and halting the blade 108 is 0.5 seconds, then the controller 140 enables the motor 112 to continue rotating the blade 108. If, however, the finger 164 moves toward the blade 108 at the rate of 10 cm/second at a distance of 6 cm, then the expected time to reach the 2 cm predetermined distance is 0.5 seconds, and the controller 140 deactivates the motor 112 and applies the brake 132 to arrest the motion of the blade 108.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A power tool comprising:
an actuator configured to move an implement;
an infrared sensor located at a first predetermined position in relation to the implement configured to generate temperature data corresponding to a region proximate to the implement, the implement being outside of the region, in which a plurality of objects approach the implement;
a range sensor located at a second predetermined position in relation to the implement and configured to generate range data corresponding to the plurality of objects in the region proximate to the implement, the implement being outside of the region; and
a controller operatively connected to the infrared sensor, the range sensor, and the actuator, the controller being configured to:
operate the actuator to move the implement;
identify a presence of an object having a temperature within a predetermined temperature range in the region proximate to the implement with reference to the temperature data received from the infrared sensor;
identify a distance between the object having the temperature within the predetermined temperature range and the implement with reference to the range data received from the range sensor; and
deactivate the actuator in response to the identified distance between the implement and the object having the temperature within the predetermined temperature range being less than a predetermined threshold.

2. The power tool of claim 1, the range sensor being configured to identify the distance to objects in the region extending in a longitudinal direction that is substantially parallel to a longitudinal axis of the implement.

3. The power tool of claim 1, the controller being further configured to:
identify a presence of another object having a temperature outside of the predetermined temperature range in the region proximate to the implement with reference to the temperature data received from the infrared sensor;
identify a distance between the other object having the temperature outside the predetermined temperature range and the implement with reference to the range data received from the range sensor; and
continue to operate the actuator in response to the identified distance of only the other object from the implement being within the predetermined threshold.

4. The power tool of claim 1, the controller being further configured to:
identify a first distance between the implement and the object having the temperature within the predetermined temperature range with reference to the range data received from the range sensor at a first time, the first distance being greater than the predetermined threshold;
identify a second distance between the implement and the object having the temperature within the predetermined temperature range with reference to the range data received from the range sensor at a second time, the second time being later than the first time, the second distance being greater than the predetermined threshold and less than the first distance;
identify a rate at which the object having the temperature within the predetermined temperature range moves toward the implement with reference to a difference between the first distance and the second distance and a difference between the first time and the second time; and
deactivate the actuator in response to the identified rate being greater than a predetermined threshold.

5. The power tool of claim 1, the controller being further configured to:
identify a first distance between the implement and the object having the temperature within the predetermined temperature range with reference to the range data received from the range sensor at a first time, the first distance being greater than the predetermined threshold;
identify a second distance between the implement and the object having the temperature within the predetermined temperature range with reference to the range data received from the range sensor at a second time, the second time being later than the first time, the second distance being greater than the predetermined threshold and less than the first distance;
identify a rate at which the object having the temperature within the predetermined temperature range moves toward the implement with reference to a difference between the first distance and the second distance and a difference between the first time and the second time;
identify an estimated time for the object having the temperature within the predetermined temperature to reach a predetermined minimum distance from the implement with reference to the second distance and the identified rate; and
deactivate the actuator in response to the estimated time being less than a predetermined threshold.

6. The power tool of claim 1 further comprising:
a brake configured to arrest movement of the implement; and
the controller being operatively connected to the brake and configured to:
activate the brake to arrest movement of the implement in response to the identified distance between the implement and the object having the temperature within the predetermined temperature range being less than the predetermined threshold.

7. The power tool of claim 1, wherein the implement is a saw blade.

8. The power tool of claim 1, wherein the implement is a bit.

9. The power tool of claim 1, wherein the implement is one of a grinding disc and a grinding wheel.

10. A method of operating a power tool comprising:

operating an actuator to move an implement associated with the power tool;

identifying a presence of an object having a temperature within a predetermined temperature range in a region proximate to the implement, the implement being located outside of the region, with reference to temperature data received from an infrared sensor;

identifying a distance between the implement and the object having the temperature within the predetermined temperature range in the region proximate to the implement, the implement being outside of the region, with reference to the range data received from a range sensor; and deactivating the actuator in response to the identified distance between the implement and the object having the temperature within the predetermined temperature range being less than a predetermined threshold.

11. The method of claim 10 further comprising:

identifying a first distance between the implement and the object having the temperature within the predetermined temperature range with reference to the range data received from the range sensor at a first time, the first distance being greater than the predetermined threshold;

identifying a second distance between the implement and the object having the temperature within the predetermined temperature range with reference to the range data received from the range sensor at a second time, the second time being later than the first time, the second distance being greater than the predetermined threshold and less than the first distance;

identifying a rate at which the object having the temperature within the predetermined temperature range moves toward the implement with reference to a difference between the first distance and the second distance and a difference between the first time and the second time; and deactivating the actuator in response to the identified rate being greater than a predetermined threshold.

12. The method of claim 10 further comprising:

identifying a first distance between the implement and the object having the temperature within the predetermined temperature range with reference to the range data received from the range sensor at a first time, the first distance being greater than the predetermined threshold;

identifying a second distance between the implement and the object having the temperature within the predetermined temperature range with reference to the range data received from the range sensor at a second time, the second time being later than the first time, the second distance being greater than the predetermined threshold and less than the first distance;

identifying a rate at which the object having the temperature within the predetermined temperature range moves toward the implement with reference to a difference between the first distance and the second distance and a difference between the first time and the second time;

identifying an estimated time for the object having the temperature within the predetermined temperature to reach a predetermined minimum distance from the implement with reference to the second distance and the identified rate; and deactivating the actuator in response to the estimated time being less than a predetermined threshold.

13. The method of claim 10 further comprising:

activating a brake to arrest movement of the implement in response to the identified distance between the implement and the object having the temperature within the predetermined temperature range being less than the predetermined threshold.

\* \* \* \* \*